US009743176B1

(12) United States Patent
Hernandez Garcia et al.

(10) Patent No.: US 9,743,176 B1
(45) Date of Patent: Aug. 22, 2017

(54) DIRECTIONAL SOUND RECORDING MODULE

(71) Applicant: Merry Electronics(Shenzhen) Co., Ltd., Guangdong (CN)

(72) Inventors: Diego Jose Hernandez Garcia, Taichung (TW); Ming-Yo Hung, Taichung (TW); Wen-Hong Wang, Taichung (TW)

(73) Assignee: Merry Electronics(Shenzhen) Co., Ltd., Guangdong (CN)

( * ) Notice: Subject to any disclaimer, the term of this patent is extended or adjusted under 35 U.S.C. 154(b) by 0 days.

(21) Appl. No.: 15/139,348

(22) Filed: Apr. 27, 2016

(30) Foreign Application Priority Data

Feb. 3, 2016 (TW) ............................ 105103435 A

(51) Int. Cl.

| | |
|---|---|
| ***H04R 3/00*** | (2006.01) |
| ***H04R 1/34*** | (2006.01) |
| ***H04R 1/08*** | (2006.01) |
| ***G11B 20/10*** | (2006.01) |

(52) U.S. Cl.

CPC ....... *H04R 1/342* (2013.01); *G11B 20/10527* (2013.01); *H04R 1/08* (2013.01); *G11B 2020/10546* (2013.01)

(58) Field of Classification Search

CPC ........ H04R 1/342; H04R 29/001; H04R 1/08; G11B 20/10527

See application file for complete search history.

(56) References Cited

U.S. PATENT DOCUMENTS

| | | | | |
|---|---|---|---|---|
| 4,757,546 A * | 7/1988 | Akino | H04R 1/342 | 381/357 |
| 6,418,229 B1 * | 7/2002 | Staat | H04R 1/326 | 181/158 |
| 8,737,661 B2 | 5/2014 | Akino | | |
| 2006/0222196 A1 * | 10/2006 | Uchimura | H04R 1/342 | 381/356 |
| 2010/0303273 A1 * | 12/2010 | Sawada | H04R 1/406 | 381/361 |
| 2011/0200221 A1 * | 8/2011 | Akino | H04R 1/083 | 381/356 |

(Continued)

FOREIGN PATENT DOCUMENTS

| | | |
|---|---|---|
| CN | 102447995 | 5/2012 |
| TW | M475116 | 3/2014 |

*Primary Examiner* — Simon King

(74) *Attorney, Agent, or Firm* — Jianq Chyun IP Office

(57) ABSTRACT

A directional sound recording module including a sound-receiving case, a plurality of sound inlet apertures, and a sound-receiving element is provided. The sound-receiving case encircles to form a chamber. A sound inlet opening and a fixing end are respectively formed at two opposite sides of the chamber. The sound inlet opening and the fixing end are communicated with each other. The sound inlet apertures are disposed on a surface of the sound-receiving case and corresponding to the chamber. An extending direction of the sound inlet apertures is perpendicular to the sound inlet opening of the sound-receiving case. The sound-receiving element is disposed at the fixing end of the sound-receiving case. The sound-receiving element is configured to record a sound entering the chamber from the sound inlet opening and the sound inlet apertures.

7 Claims, 7 Drawing Sheets

100

(56) References Cited

U.S. PATENT DOCUMENTS

| | | | | |
|---|---|---|---|---|
| 2011/0305359 | A1* | 12/2011 | Ikeda | H04R 1/083<br>381/356 |
| 2012/0014542 | A1* | 1/2012 | Akino | H04R 1/406<br>381/174 |
| 2012/0263333 | A1* | 10/2012 | Akino | H04R 1/025<br>381/356 |
| 2013/0064409 | A1* | 3/2013 | Ikeda | H04R 1/08<br>381/356 |
| 2013/0287225 | A1* | 10/2013 | Niwa | G10L 21/0232<br>381/92 |

* cited by examiner

DIRECTIONAL SOUND RECORDING MODULE

CROSS REFERENCE TO RELATED APPLICATION

This application claims the priority benefits of Taiwan application serial no. 105103435, filed on Feb. 3, 2016. The entirety of the above-mentioned patent application is hereby incorporated by reference herein and made a part of specification.

BACKGROUND OF THE INVENTION

1. Field of the Invention

The invention generally relates to a sound recording module, and more particularly, to a directional sound recording module.

2. Description of Related Art

Conventional electronic devices, such as mobile phones, tablet PCs, notebook computers or personal digital assistants (PDAs), are mostly each being installed with a microphone in the casing thereof for recording sounds. However, the casing has a sound blocking effect and thus makes it difficult for the microphone installed within the casing to receive all the sounds. Directional microphones can receive clearly the sounds from a specific direction and suppress ambient noises, and thus are broadly applied in the electronic devices, such as the mobile phones, the tablet PCs, the notebook computers or the PDAs.

However, the directional microphones can only provide favorable sound recording effects in an open space, and if the directional microphones are installed within the electronic devices, then sound waves from the outside would be liable to the influence of the casings, thereby lowering a sound recording quality of the directional microphones. Hence, conventional directional microphones are mostly connected to the electronic devices externally when being used, so as to ensure the sound recording quality thereof. Accordingly, how to integrate a directional microphone into the casing of an electronic device while maintaining favorable sound recording quality is one of the critical issues in need to be solved urgently.

SUMMARY OF THE INVENTION

The invention is directed to a directional sound recording module which has a favorable sound recording quality.

The invention provides a directional sound recording module which includes a sound-receiving case, a plurality of sound inlet apertures and a sound-receiving element. The sound-receiving case encircles to form a chamber. A sound inlet opening and a fixing end are respectively formed at two opposite sides of the chamber. The sound inlet opening and the fixing end are communicated with each other. The sound inlet apertures are disposed on a surface of the sound-receiving case and corresponding to the chamber. An extending direction of the sound inlet apertures and the sound inlet opening of the sound-receiving case appear in form of an included angle. The sound-receiving element is disposed at the fixing end of the sound-receiving case, wherein the sound-receiving element is configured to record to record a sound entering the chamber from the sound inlet opening and the sound inlet apertures.

In one embodiment of the invention, the fixing end is a sound output hole.

In one embodiment of the invention, a spacing between any two adjacent sound inlet apertures is the same.

In one embodiment of the invention, a spacing between any two adjacent sound inlet apertures is different.

In one embodiment of the invention, an opening cross-sectional area of one of the sound inlet apertures which is relatively close to the sound-receiving element is smaller than or equal to an opening cross-sectional area of another one of the sound inlet apertures which is relatively distant to the sound-receiving element.

In one embodiment of the invention, the chamber has a plurality of cross-sections perpendicular to the extending direction of the sound inlet apertures, and an area of one of the cross-sections which is relative close to the sound-receiving element, is smaller than or equal to an area of another one of the cross-sections which is relatively distant to the sound-receiving element.

In one embodiment of the invention, the sound inlet apertures are respectively spaced apart from the sound-receiving element with unequal distances.

In one embodiment of the invention, the sound-receiving case is divided into a first region and a second region adjacent to each other, the first region is located between the sound-receiving element and the second region, and the number of the sound inlet apertures located in the first region is smaller than the number of the sound inlet apertures located in the second region.

In view of the above, the directional sound recording module of the invention encircles at least one chamber within the sound-receiving case and is disposed with a plurality of sound inlet apertures on a surface of the sound-receiving case. The sound inlet opening and the sound-receiving element are respectively located at the two ends of the chamber, wherein the sound inlet apertures are arranged between the sound inlet opening and the sound-receiving element, and the sound inlet apertures and the sound inlet opening are communicated with the chamber. Accordingly, sound waves from the outside can enter the chamber from the sound inlet opening and the sound inlet apertures and be recorded by the sound-receiving element after being noise filtered by the sound inlet apertures, and thus the sound recording quality can be improved.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
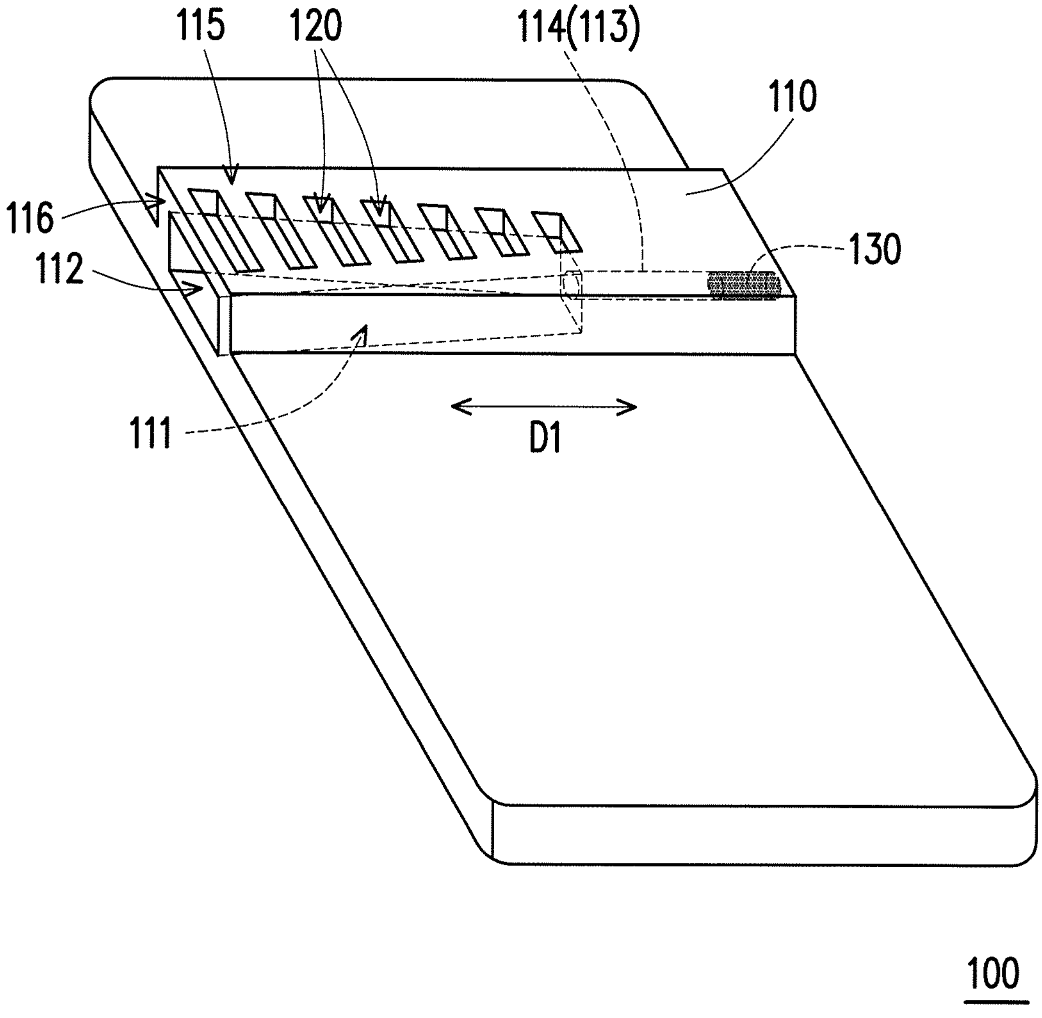
FIG. 1 is a schematic diagram illustrating a directional sound recording module according to a first embodiment of the invention.

FIG. 1 is a schematic diagram illustrating a directional sound recording module according to a first embodiment of the invention. Referring to FIG. 1, in the present embodiment, a directional sound recording module 100 includes a first sound-receiving case 110, a plurality of first sound inlet apertures 120 and a first sound-receiving element 130. The first sound-receiving case 110 may be formed by metal, plastic, acrylic, a composite material or other suitable material, wherein the first sound-receiving case 110 is, for example, a part of the casing of an electronic device. In other words, the first sound-receiving case 110 of the present embodiment may be integrated into one with the casing of the electronic device.

The first sound-receiving case 110 encircles to form a first chamber 111, wherein a first sound inlet opening 112 and a first fixing end 113 are respectively formed at two opposite ends of the first chamber 111, the first sound inlet opening 112 and the first chamber 111 are communicated with each other, and the first fixing end 113 may be a first sound output hole 114 communicated with the first chamber 111. The first sound inlet apertures 120 are disposed on a surface 115 of the first sound-receiving case 110 and corresponding to the first chamber 111. The surface 115 is perpendicular to a surface 116 at which the first sound inlet opening 112 locates. On the other hand, an extending direction D1 of the first sound inlet apertures 120 and the first sound inlet opening 112 of the first sound-receiving case 110 appear in form of an included angle. The present embodiment is described with an example, in which the extending direction D1 of the first sound inlet apertures 120 is perpendicular to the first sound inlet opening 112 of the first sound-receiving case 110, but the invention is not limited thereto. The first sound inlet apertures 120 are communicated with the first chamber 111, and the first sound inlet apertures 120 are arranged between the first sound inlet opening 112 and the first fixing end 113 (or the first sound output hole 114). In the present embodiment, a spacing between any two adjacent first sound inlet apertures 120 can be the same. In other embodiments, a spacing between any two adjacent first sound inlet aperture can be different. The invention does not intend to further limit the spacing between any two adjacent first sound inlet apertures.

In the present embodiment, the first sound-receiving element 130 is disposed at the first fixing end 113 (or the first sound output hole 114) of the first sound-receiving case 110 and is opposite to the first sound inlet opening 112. In detail, the first sound inlet apertures 120 constitute a directivity pattern on the surface 115 of the first sound-receiving case 110 and are arranged from a side of the surface 115 of the first sound-receiving case 110 that is close to the first sound inlet opening 112 to another side of the surface 115 of the first sound-receiving case 110 that is close to the first sound output hole 114, wherein the first sound inlet apertures 120 are respectively spaced apart from the first sound-receiving element 130 with unequal distances. Under such an arrangement, a sound-receiving sensitivity of the directional sound recording module 100 at a specific angle or in a specific direction can be controlled through the first sound inlet apertures 120, thereby providing a favorable directivity. On the other hand, sound waves from the outside not only can enter the first chamber 111 from the first sound inlet opening 112 but also can enter the first chamber 111 through the first sound inlet apertures 120, and finally be recorded by the first sound-receiving element 130. Since the time for the sound waves from the outside enter the first chamber 111 through the first sound inlet apertures 120 varies, the time for the sound waves to reach the first sound-receiving element 130 can be delayed, and thereby produces a constructive interference and a destructive interference. That is to say, through using the first sound inlet apertures 120 to constitute the directivity pattern on the surface 115 of the first sound-receiving case 110, the directional sound recording module 100 can control the interference of the sound waves entering the first chamber 111 such that the sound waves can be recorded by the first sound-receiving element 130 after being noise filtered, and thereby improves the sound recording quality.

As shown in FIG. 1, openings of the first sound inlet apertures 120 appear to be quadrilateral, and opening cross-sectional areas of the first sound inlet apertures 120 gradually reduce from the first sound inlet opening 112 towards the first sound-receiving element 130, that is, an opening cross-sectional area of one of the first sound inlet apertures 120 which is relatively close to the first sound-receiving element 130 will be smaller than an opening cross-sectional area of another one of the first sound inlet apertures 120 which is relatively distant to the first sound-receiving element 130. Accordingly, frequency compositions of the recorded sounds can be determined through controlling the sizes of the opening cross-sectional areas of the first sound inlet apertures 120. It is worth mentioning that, the first chamber 111 of the present embodiment has a plurality of cross-sections perpendicular to the extending direction D1 of the first sound inlet apertures 120, wherein an area of one of the cross-sections which is relatively close to the first sound-receiving element 130 is smaller than an area of another one of the cross-sections which is relatively distant to the first sound-receiving element 130.

In general, the first sound-receiving element 130 is electrically connected to a circuit board (not shown) and electrically connected to a sound processing unit (not shown) through the circuit board (not shown), wherein the sound processing unit (not shown) is electrically connected to a sound storage unit (not shown) through the circuit board (not shown). As such, the sound recorded by the first sound-receiving element 130 can be transmitted to the sound processing unit (not shown) through the circuit board (not shown), and be transmitted to the sound storage unit (not shown) through the circuit board (not shown) so as to be stored after the sound is processed.

Several other embodiments are described below as examples of the invention. It is to be noted that, the following embodiments have adopted component notations and part of the contents from the previous embodiment, wherein the same notations are used for representing the same or similar components, and descriptions of the same technical contents are omitted. The descriptions regarding the omitted part may be referred to the previous embodiment, and thus are not repeated herein.

Figure 2:
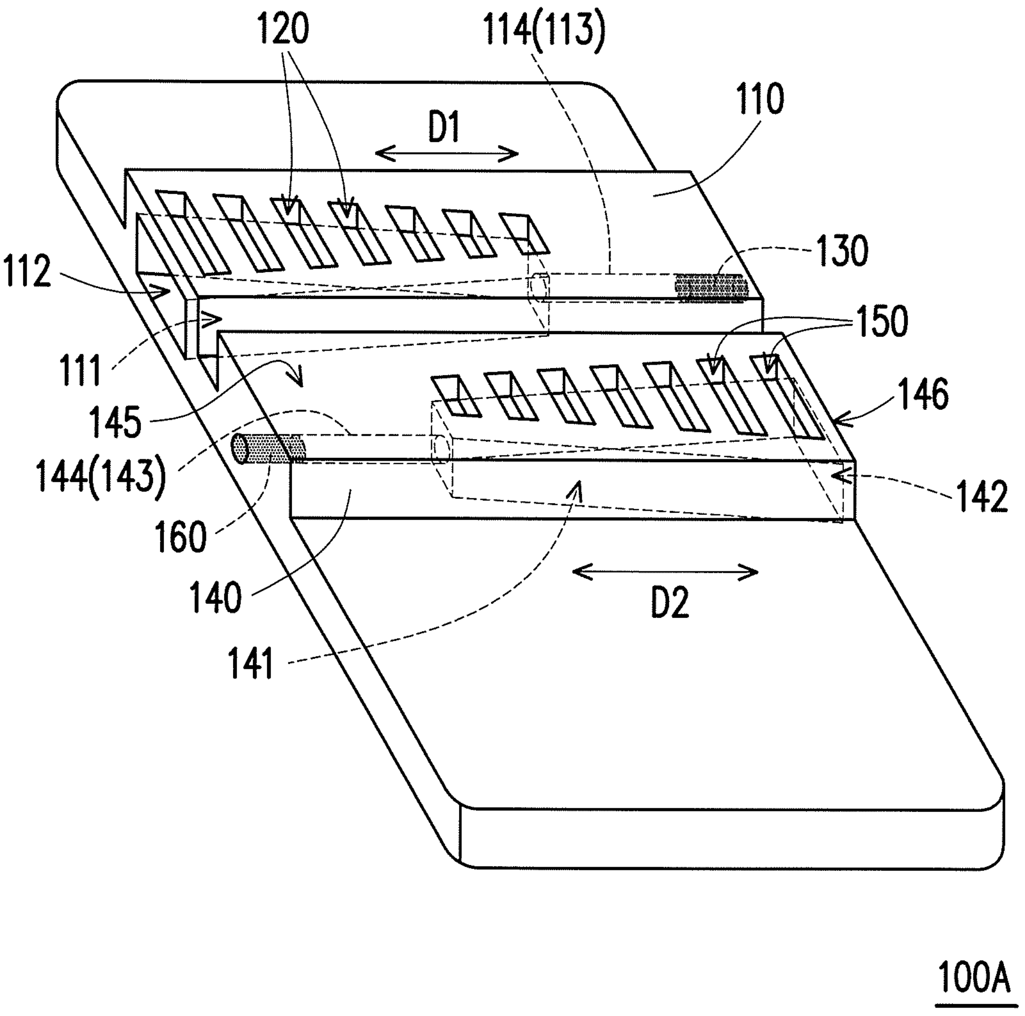
FIG. 2 is a schematic diagram illustrating a directional sound recording module according to a second embodiment of the invention.

FIG. 2 is a schematic diagram illustrating a directional sound recording module according to a second embodiment of the invention. Referring to FIG. 2, the directional sound recording module 100A of the present embodiment is substantially similar to the directional sound recording module 100 of the first embodiment, whereby a difference between the two lies in that: the directional sound recording module 100A is, for example a bidirectional sound recording module which is derived from the design of the directional sound recording module 100. In detail, the directional sound recording module 100A further includes a second sound-receiving case 140, a plurality of second sound inlet apertures 150 and a second sound-receiving element 160. The second sound-receiving case 140 and the first sound-receiving case 110 are juxtaposed and can be integrated into one with the casing of the electronic device. The second sound-receiving case 140 encircles to form a second chamber 141, wherein a second sound inlet opening 142 and a second fixing end 143 are respectively formed at two opposite ends of the second chamber 141, the second sound inlet opening 142 and the second chamber 141 are communicated with each other, and the second fixing end 143 may be a second sound output hole 144 communicated with the second chamber 141.

As shown in FIG. 2, the second sound output hole 144 and the first sound inlet opening 112 are located at a same side, and the second sound inlet opening 142 and the first sound-receiving element 130 are located at a same side. The second sound inlet apertures 150 are disposed on a surface 145 of the second sound-receiving case 140 and corresponding to the second chamber 141 so as to be communicated with the second chamber 141. The surface 145 and a surface 146 at which the second sound inlet opening 142 locates are perpendicular to each other. A directivity pattern constituted by the second sound inlet apertures 150 on the surface 145 of the second sound-receiving case 140 and the directivity pattern constituted by the first sound inlet apertures 120 on the surface 115 of the first sound-receiving case 110 are the same or similar, but the arrangements of the two directivity patterns are opposite. In other words, opening cross-sectional areas of the second sound inlet apertures 150 gradually reduce from the second sound inlet opening 142 towards the second sound-receiving element 160, and the second chamber 141 has a plurality of cross-sections perpendicular to an extending direction D2 of the second sound inlet apertures 150, that is, an area of one of the cross-sections which is relatively close to the second sound-receiving element 160 is smaller than an area of another one of the cross-sections which is relatively distant to the second sound-receiving element 160.

The second sound-receiving element 160 is disposed at the second fixing end 143 (or the second sound output hole 144) of the second sound-receiving case 110 and opposite to the second sound inlet opening 142. The sound waves from the outside not only can enter the first chamber 111 from the second sound inlet opening 142 but also can enter the second chamber 141 through the second sound inlet apertures 150, and finally be recorded by the second sound-receiving element 160. Since the time for the sound waves from the outside to enter the second chamber 141 through the second sound inlet apertures 150 varies, the time for the sound waves to reach the second sound-receiving element 160 can be delayed, and thereby produces a constructive interference and a destructive interference. That is to say, through using the second sound inlet apertures 150 to constitute the directivity pattern on the surface 145 of the second sound-receiving case 140, the directional sound recording module 100A can control an interference of the sound waves entering the second chamber 141 such that the sound waves can be recorded by the second sound-receiving element 160 after being noise filtered, and thereby improves the sound recording quality.

As shown in FIG. 2, the first sound inlet opening 112 and the second sound inlet opening 142 are located at two opposite sides, and thus the directional sound recording module 100A can be used to collect the sound waves from two different directions, respectively, thereby enabling the sound waves from various directions to be recorded by the corresponding first sound-receiving element 130 or the corresponding second sound-receiving element 160.

Figure 3:
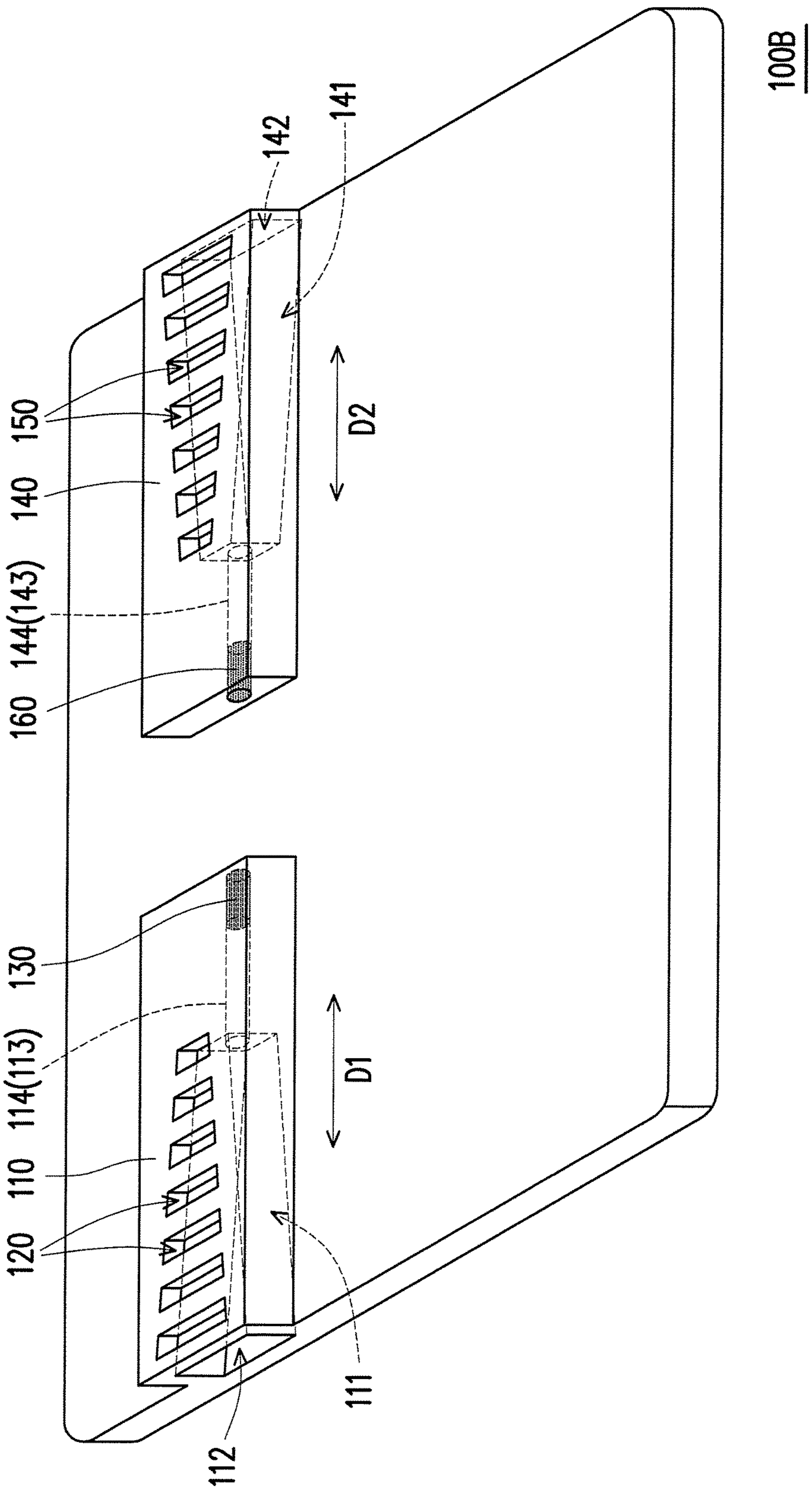
FIG. 3 is a schematic diagram illustrating a directional sound recording module according to a third embodiment of the invention.

FIG. 3 is a schematic diagram illustrating a directional sound recording module according to a third embodiment of the invention. Referring to FIG. 3, the directional sound recording module 100B of the present embodiment is substantially similar to the directional sound recording module 100A of the second embodiment, whereby differences between the two lies in that: the first sound-receiving case 110 and the second sound-receiving case 140 of the directional sound recording module 100B are disposed symmetrically, and there is a spacing maintained between the two. On the other hand, the first sound-receiving element 130 faces towards the second sound-receiving element 160.

Figure 4A:
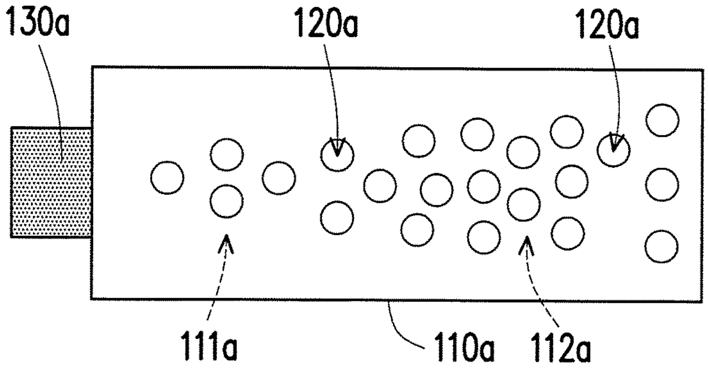
FIG. 4A through FIG. 4F are schematic diagrams respectively illustrating configurations of a plurality of sound inlet apertures on a sound-receiving case according to other embodiments of the invention.

FIG. 4A through FIG. 4F are schematic diagrams respectively illustrating configurations of a plurality of sound inlet apertures on a sound-receiving case according to other embodiments of the invention. As shown in FIG. 4A, openings of the sound inlet apertures 120*a* on the sound-receiving case 110*a* appear to be circular, wherein the sound-receiving case 110*a* may be divided into a first region 111*a* and a second region 112*a* adjacent to each other, and the first region 111*a* is located between the sound-receiving element 130*a* and the second region 112*a*. The number of the sound inlet apertures 120*a* located in the first region 111*a* is smaller than the number of the sound inlet apertures 120*a* located in the second region 112*a*. In other embodiments, openings of the sound inlet apertures may appear to be elliptical or in shape of other polygons.

Figure 4B:
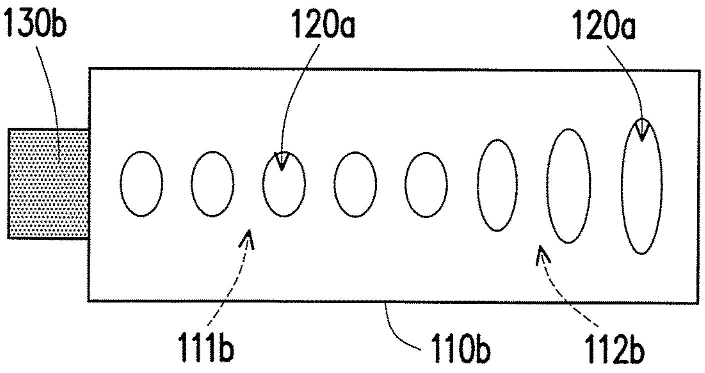

As shown in FIG. 4B, openings of the sound inlet apertures 120*b* on the sound-receiving case 110*b* appear to be elliptical, wherein the sound-receiving case 110*b* may be divided into a first region 111*b* and a second region 112*b* adjacent to each other, and the first region 111*b* is located between the sound-receiving element 130*b* and the second region 112*b*. In detail, opening cross-sectional areas of the sound inlet apertures 120*b* located in the first region 111*b* are smaller than opening cross-sectional areas of the sound inlet apertures 120*b* located in the second region 112*b*, wherein the opening cross-sectional area of the sound inlet aperture 120*b* that is farthest away from the sound-receiving element 130*b* is the largest. On the other hand, a spacing between any two adjacent sound inlet apertures 120*b* is, for example, the same. In other embodiments, the openings of the sound inlet apertures may appear to be circular or in shape of other polygons.

Figure 4C:
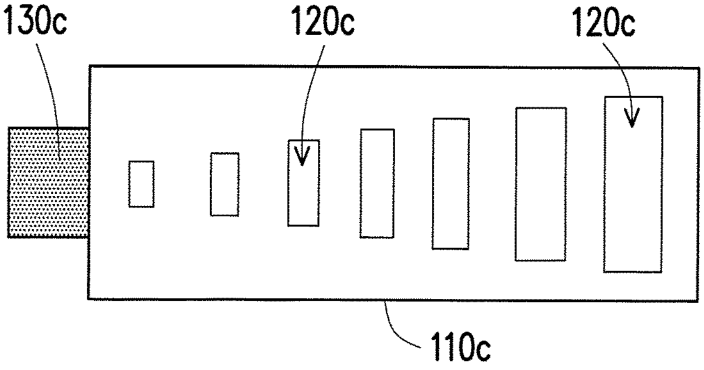

As shown in FIG. 4C, openings of the sound inlet apertures 120*c* on the sound-receiving case 110*c* appear to be quadrilateral, wherein an opening cross-sectional area of one of the sound inlet apertures 120*c* which is relatively close to the sound-receiving element 130*c* is smaller than an opening cross-sectional area of another one of the sound inlet apertures 120*c* which is relatively distant to the sound-receiving element 130*c*, and a spacing between any two adjacent sound inlet apertures 120*c* is different. In other embodiments, the openings sound inlet apertures may appear to be circular, elliptical or in shape of other polygons.

Figure 4D:
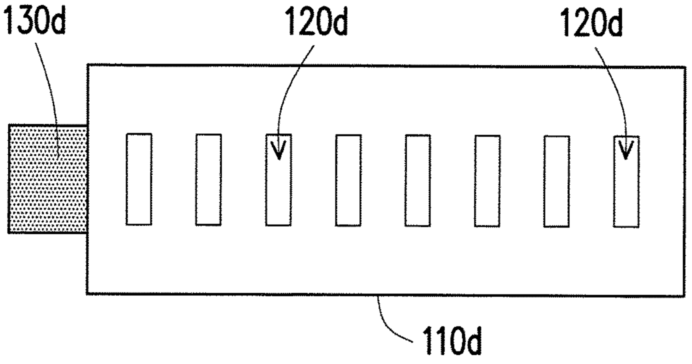

As shown in FIG. 4D, openings of the sound inlet apertures 120*d* on the sound-receiving case 110*d* appear to be quadrilateral, wherein an opening cross-sectional area of one of the sound inlet apertures 120*d* which is relatively close to the sound-receiving element 130*d* is equal to an opening cross-sectional area of another one of the sound inlet apertures 120*d* which is relatively distant to the sound-receiving element 130*d*, and a spacing between any two adjacent sound inlet apertures 120*d* is the same. In other embodiments, the openings of the sound inlet apertures may appear to be circular, elliptical or in shape of other polygons.

Figure 4E:
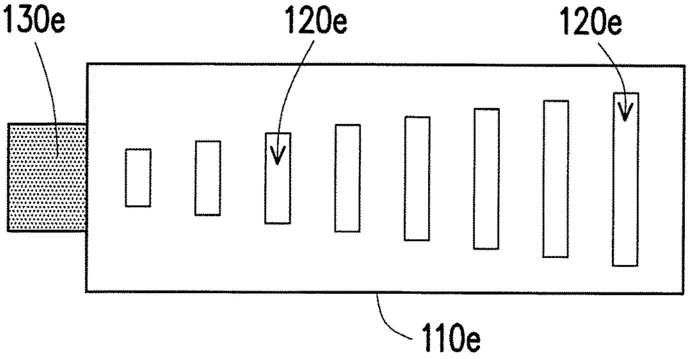

As shown in FIG. 4E, openings of the sound inlet apertures 120*e* on the sound-receiving case 110*e* appear to be quadrilateral, wherein an opening cross-sectional area of one of the sound inlet apertures 120*e* which is relatively close to the sound-receiving element 130*e* is smaller than an opening cross-sectional area of another one of the sound inlet apertures 120*e* which is relatively distant to the sound-receiving element 130*e*, and a spacing between any two adjacent sound inlet apertures 120*e* is the same. In other embodiments, the openings of the sound inlet apertures may appear to be circular, elliptical or in shape of other polygons.

Figure 4F:
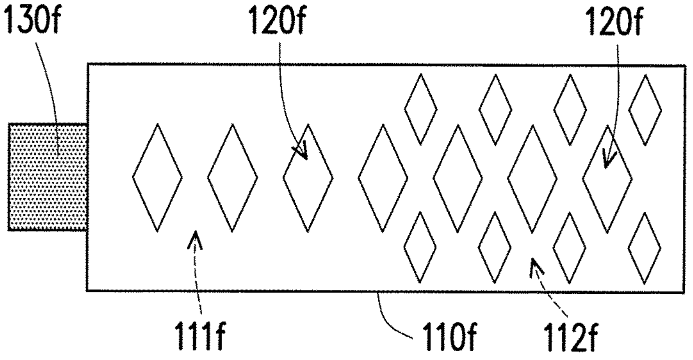

As shown in FIG. 4F, openings of the sound inlet apertures 120*f* on the sound-receiving case 110*f* appear to be rhombic, wherein the sound-receiving case 110*f* may be divided into a first region 111*f* and a second region 112*f* adjacent to each other, and the first region 111*f* is located between the sound-receiving element 130*f* and the second region 112*f*. A sum of opening cross-sectional areas of the sound inlet apertures 120*f* located in the first region 111*f* is smaller than a sum of the opening cross-sectional areas of the sound inlet apertures 120*f* located in the second region 112*f*. In other embodiments, the openings of the sound inlet apertures may appear to be circular, elliptical or in shape of other polygons.

Figure 5A:
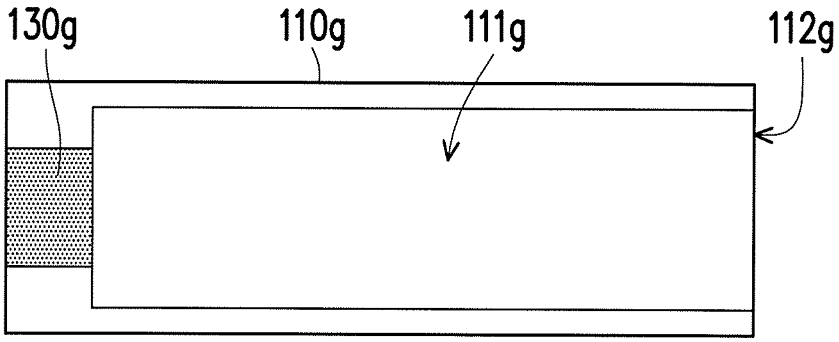
FIG. 5A through FIG. 5D are cross-sectional schematic diagrams respectively illustrating a chamber of a sound-receiving case according to other embodiments of the invention.
Figure 5B:
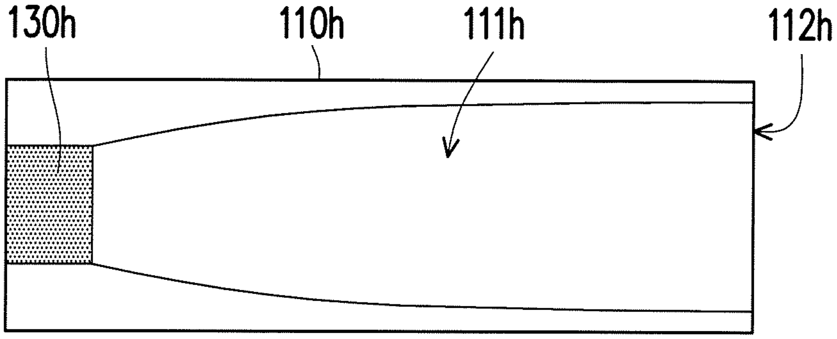
Figure 5C:
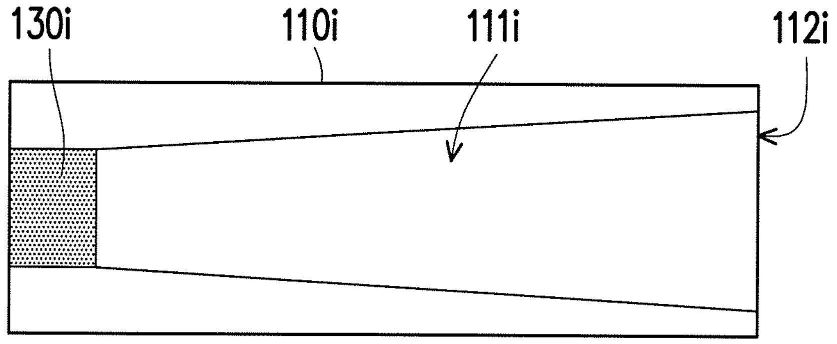
Figure 5D:
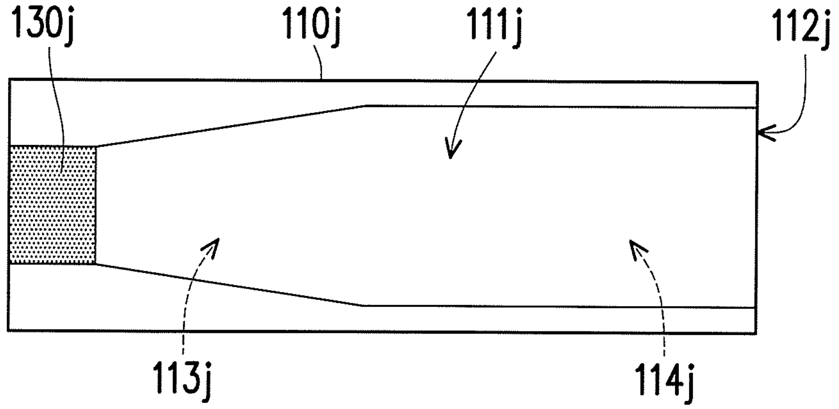

FIG. 5A through FIG. 5D are cross-sectional schematic diagrams respectively illustrating a chamber of a sound-receiving case according to other embodiments of the invention. As shown in FIG. 5A, the chamber 111*g* in the sound-receiving case 110*g* has a plurality of cross-sections parallel to the sound inlet opening 112*g*, wherein an area of one of the cross-sections which is relatively close to the sound-receiving element 130*g* is equal to an area of another one of the cross-sections which is relatively distant to the sound-receiving element 130*g*. As shown in FIG. 5B, the chamber 111*h* in the sound-receiving case 110*h* has a plurality of cross-sections parallel to the sound inlet opening 112*h*, wherein an area of one of the cross-sections which is relatively close to the sound-receiving element 130*h* is smaller than an area of another one of the cross-sections which is relatively distant to the sound-receiving element 130*h*. On the other hand, an inner wall surface of the chamber 111*h* appears to be arc-shaped. As shown in FIG. 5C, the chamber 111*i* in the sound-receiving case 110*i* has a plurality of cross-sections parallel to the sound inlet opening 112*i*, wherein an area of one of the cross-sections which is relatively close to the sound-receiving element 130*i* is smaller than an area of another one of the cross-sections which is relatively distant to the sound-receiving element 130*i*. On the other hand, an inner wall surface of the, chamber 111*i* appears to be linear-shaped. As shown in FIG. 5D, the chamber 111*j* in the sound-receiving case 110*j* has a plurality of cross-sections parallel to the sound inlet opening 112*j*, wherein the sound-receiving case 110*j* may be divided into a first region 113*j* and a second region 114*j* adjacent to each other, and the first region 113*j* is located between the sound-receiving element 130*j* and the second region 114*j*. Areas of the cross-sections located in the second region 114*j* are equal, and areas of the cross-sections located in the first region 113*j* gradually reduce from the sound inlet opening 112*j* towards the sound-receiving element 130*j*.

In summary, the directional sound recording module of the invention encircles at least one chamber within the sound-receiving case and is disposed with a plurality of sound inlet apertures on a surface of the sound-receiving case. The sound inlet opening and the sound-receiving element are respectively located at the two ends of the chamber, wherein the sound inlet apertures are arranged between the sound inlet opening and the sound-receiving element, and the sound inlet apertures and the sound inlet opening are communicated with the chamber. Accordingly, the sound waves from the outside can enter the chamber from the sound inlet opening and the sound inlet apertures and be recorded by the sound-receiving element after being noise filtered by the sound inlet apertures, and thus the sound recording quality can be improved. On the other hand, the invention can integrate the sound-receiving case as one with the casing of the electronic device and can install the sound-receiving element at one end of the chamber of the sound-receiving case. As compared to the conventional directional microphone which is connected to the electronic device externally, the invention can reduce an influence of the casing of the electronic device on the sound waves through using the sound inlet apertures arranged on the sound-receiving case, and thereby maintain the sound recording quality thereof.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A directional sound recording module, comprising:

a sound-receiving case, encircling to form a chamber, wherein a sound inlet opening and a fixing end are respectively formed at two opposite sides of the chamber, and the sound inlet opening and the fixing end are communicated with each other;

a plurality of sound inlet apertures, disposed on a surface of the sound-receiving case and corresponding to the chamber, wherein an extending direction of the sound inlet apertures and the surface at which the sound inlet apertures locate are perpendicular to a surface of the sound-receiving case at which the sound inlet opening locates;

a sound-receiving element, disposed at the fixing end of the sound-receiving case, wherein the sound-receiving element is configured to record a sound entering the chamber from the sound inlet opening and the sound inlet apertures, wherein the chamber has a plurality of cross-sections perpendicular to the extending direction of the sound inlet apertures, and one of the cross-sections which is closer to the sound-receiving element than another one of the cross-sections has a smaller area than that of the another one of the cross-sections.

2. The directional sound recording module as recited in claim 1, wherein the fixing end is a sound output hole.

3. The directional sound recording module as recited in claim 1, wherein a spacing between any two adjacent sound inlet apertures is the same.

4. The directional sound recording module as recited in claim 1, wherein a spacing between any two adjacent sound inlet apertures is different.

5. The directional sound recording module as recited in claim 1, wherein one of the sound inlet apertures which is closer to the sound-receiving element than another one of the sound inlet apertures has a smaller opening cross-sectional area than or the same opening cross-sectional area as that of the another one of the sound inlet apertures.

6. The directional sound recording module as recited in claim 1, wherein the sound inlet apertures are respectively spaced apart from the sound-receiving element with unequal distances.

7. The directional sound recording module as recited in claim 1, wherein the sound-receiving case is divided into a first region and a second region adjacent to each other, the first region is located between the sound-receiving element and the second region, and the number of the sound inlet apertures located in the first region is smaller than the number of the sound inlet apertures located in the second region.

* * * * *